US008160596B2

(12) United States Patent
Black et al.

(10) Patent No.: US 8,160,596 B2
(45) Date of Patent: Apr. 17, 2012

(54) ASYMMETRIC MODE OF OPERATION IN MULTI-CARRIER COMMUNICATION SYSTEMS

(75) Inventors: Peter John Black, San Diego, CA (US); Rashid Ahmed Akbar Attar, San Diego, CA (US); Ramin Rezaiifar, San Diego, CA (US); Parag Arun Agashe, San Diego, CA (US); Mingxi Fan, San Diego, CA (US); Roberto Rimini, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1227 days.

(21) Appl. No.: 11/486,513

(22) Filed: Jul. 13, 2006

(65) Prior Publication Data

US 2007/0060165 A1 Mar. 15, 2007

Related U.S. Application Data

(60) Provisional application No. 60/701,206, filed on Jul. 20, 2005, provisional application No. 60/709,944, filed on Aug. 18, 2005.

(51) Int. Cl.
*H04W 72/00* (2009.01)
(52) U.S. Cl. ........................................ 455/450
(58) Field of Classification Search .......... 455/450, 455/522, 445; 370/335, 342, 328, 319, 469, 370/437, 473
See application file for complete search history.

(56) References Cited

U.S. PATENT DOCUMENTS

| 6,643,280 | B1 | 11/2003 | Li et al. | |
|---|---|---|---|---|
| 7,154,846 | B2* | 12/2006 | Chen et al. | 370/209 |
| 7,215,653 | B2 | 5/2007 | Kim et al. | |
| 2001/0030948 | A1* | 10/2001 | Tiedemann, Jr. | 370/305 |
| 2001/0055294 | A1* | 12/2001 | Motoyoshi | 370/342 |
| 2004/0053619 | A1* | 3/2004 | Kim et al. | 455/445 |

(Continued)

FOREIGN PATENT DOCUMENTS

JP 6311192 11/1994

(Continued)

OTHER PUBLICATIONS

International Search Report—PCT/US2006/028102, International Searching Authority—European Patent Office—Mar. 26, 2007.

(Continued)

*Primary Examiner* — Melody Mehrpour
(74) *Attorney, Agent, or Firm* — D. Scott Juneau

(57) ABSTRACT

A method and system for providing asymmetric modes of operation in multi-carrier wireless communication systems. A method may assign a long code mask (LCM) to an information channel associated with a plurality of forward link carriers to transmit data from an access network to an access terminal; and multiplex the information channel on a reverse link carrier. The information channel may include one of data source channel (DSC), data rate control (DRC) and acknowledgment (ACK) information, and the multiplexing may be code division multiplexing (CDM). The AN may instruct the AT on whether to multiplex the DSC information based on feedback from the AT. The method may further offset the ACK information on the reverse link to reduce the reverse link peak to average, CDM the information channel on an I-branch and on a Q-branch, and transmit the code division multiplexed information channel on the reverse link carrier.

34 Claims, 13 Drawing Sheets

U.S. PATENT DOCUMENTS

| | | | |
|---|---|---|---|
| 2006/0104228 A1* | 5/2006 | Zhou et al. | 370/328 |
| 2006/0268883 A1* | 11/2006 | Qian et al. | 370/394 |
| 2007/0015529 A1* | 1/2007 | Choi et al. | 455/522 |
| 2007/0060060 A1* | 3/2007 | Qian | 455/63.1 |
| 2007/0171840 A1* | 7/2007 | Kim et al. | 370/252 |
| 2008/0013639 A1* | 1/2008 | Rick et al. | 375/260 |
| 2011/0026497 A1* | 2/2011 | Rezaiifar et al. | 370/335 |

FOREIGN PATENT DOCUMENTS

| | | |
|---|---|---|
| JP | 2002524913 T | 8/2002 |
| JP | 2003009240 A | 1/2003 |
| JP | 2003522446 T | 7/2003 |
| JP | 2004531100 | 10/2004 |
| JP | 2008536407 | 9/2008 |
| KR | 20020073441 | 9/2002 |
| KR | 20040064865 | 7/2004 |
| TW | 502543 | 9/2002 |
| TW | 536874 | 6/2003 |
| WO | WO0013343 | 3/2000 |
| WO | WO0201762 | 1/2002 |
| WO | WO0237890 | 5/2002 |
| WO | 2004019649 A2 | 3/2004 |
| WO | WO2005004371 A2 | 1/2005 |
| WO | WO2005004500 A2 | 1/2005 |

OTHER PUBLICATIONS

Written Opinion—PCT/US2006/028102, International Searching Authority—European Patent Office—Mar. 26, 2007.

International Preliminary Report on Patentability—PCT/US2006/028102, International Bureau of WIPO—Geneva, Switzerland—Jan. 22, 2008.

Attar, Rashid, et al., Evolution of cdma2000 cellular networks: multicarrier EV-DO. IEEE Communications Magazine, Mar. 2006, XP-002415258, pp. 46-53.

Lott, C., et al., Reverse traffic channel MAC design of cdma2000 1xEV-DO revision A systems. IEEE May 2005, XP 010855656, pp. 1416-1421.

* cited by examiner

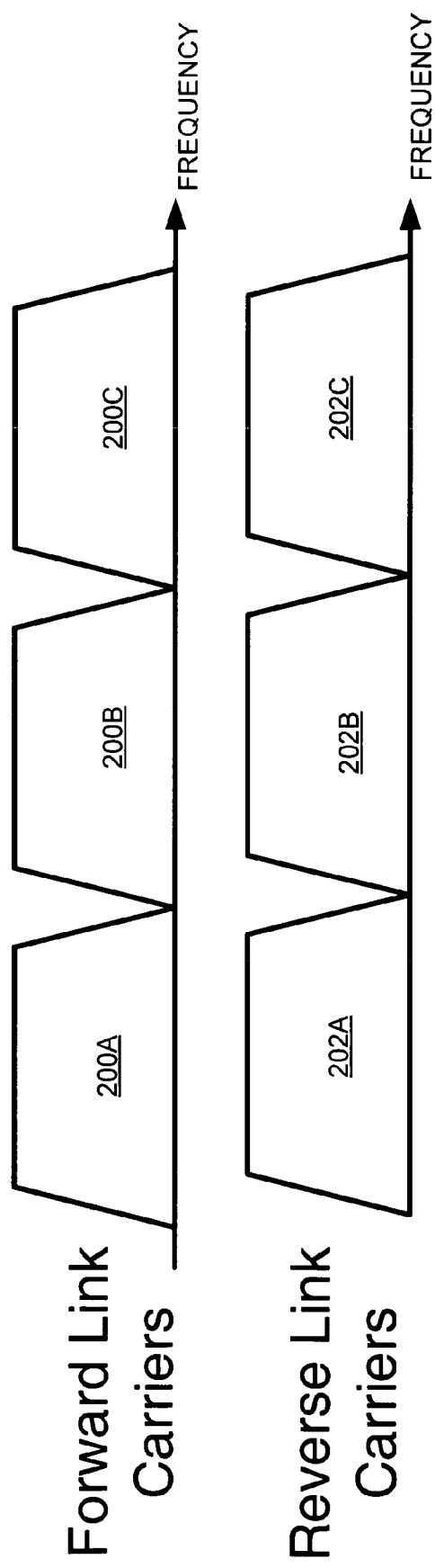

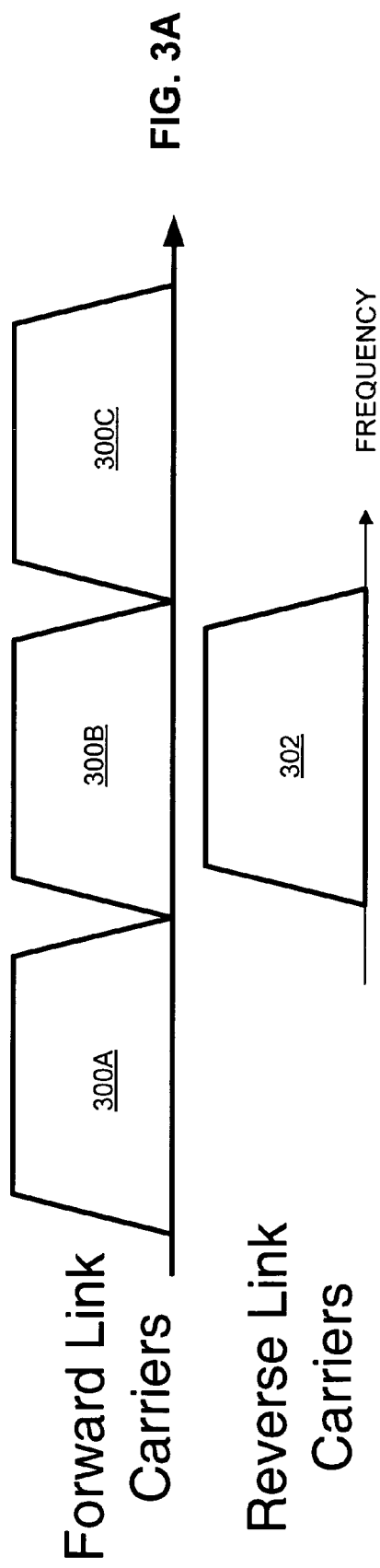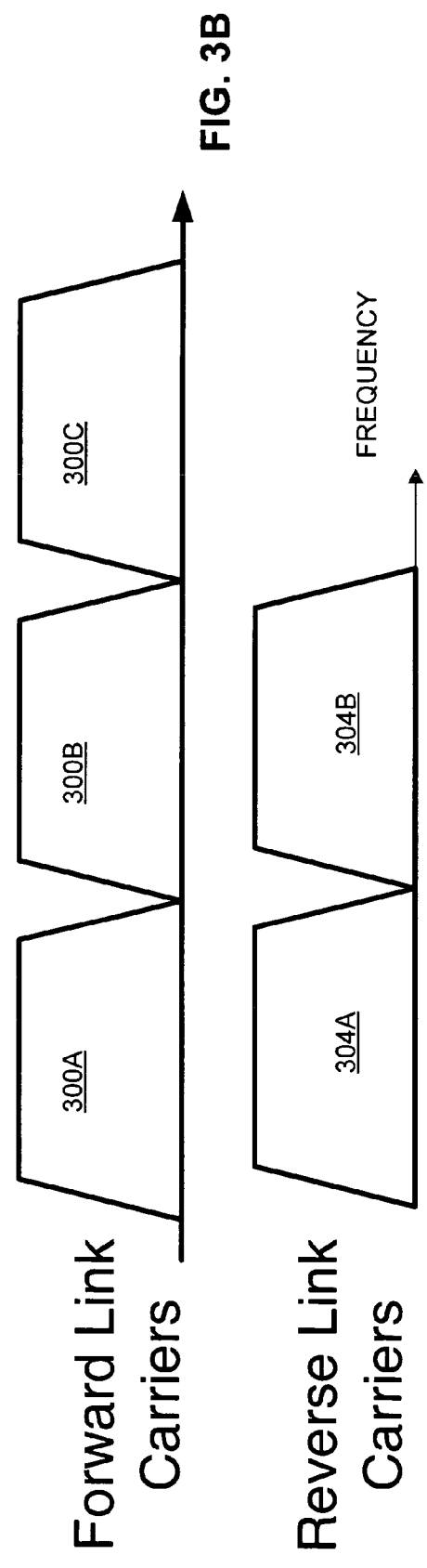

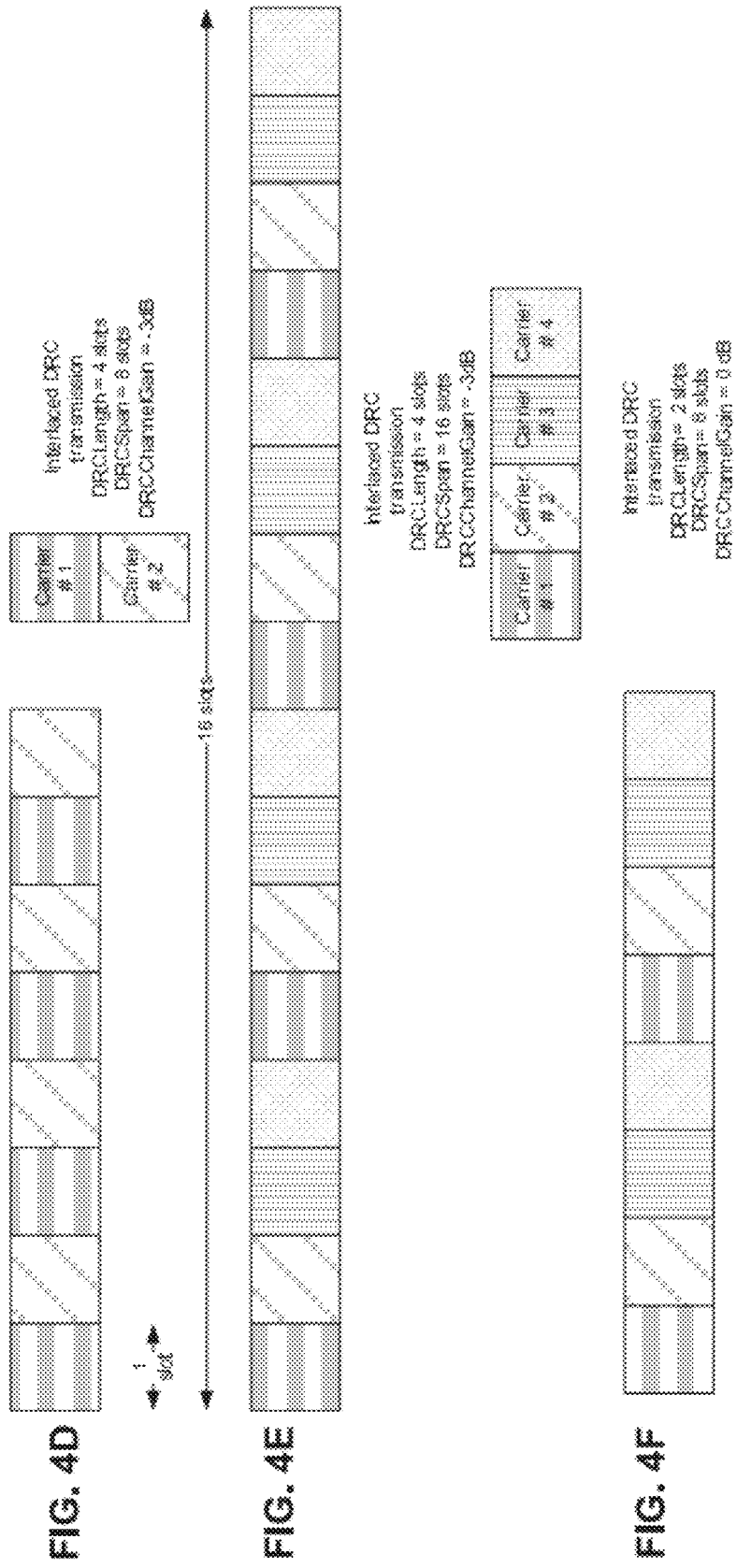

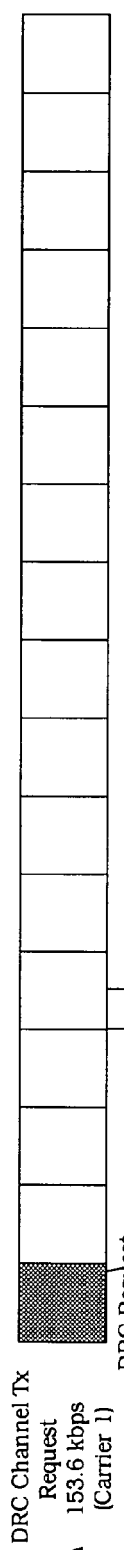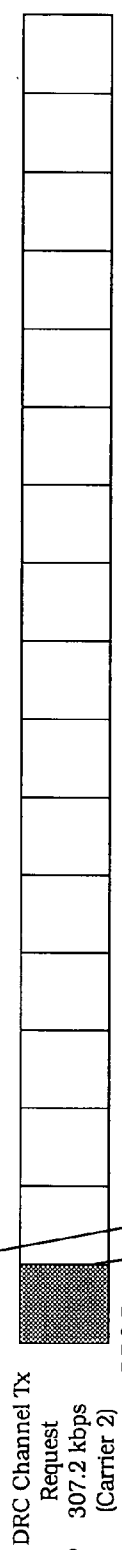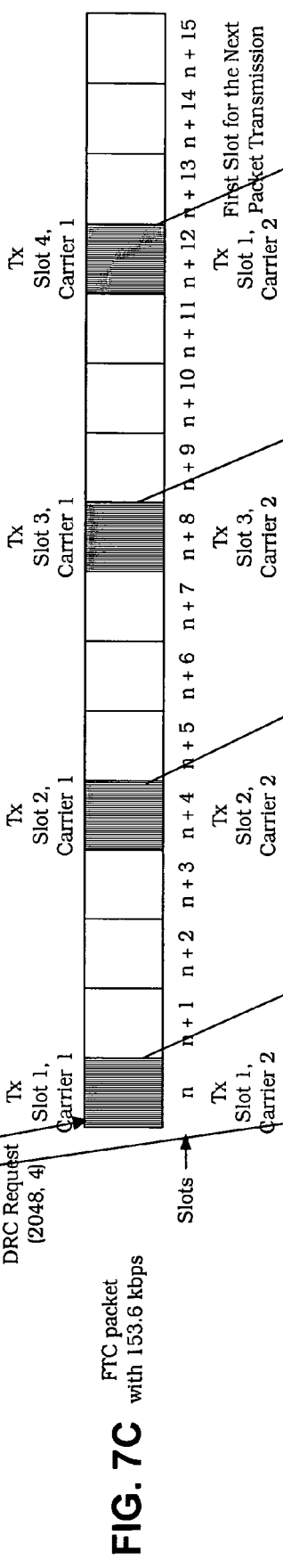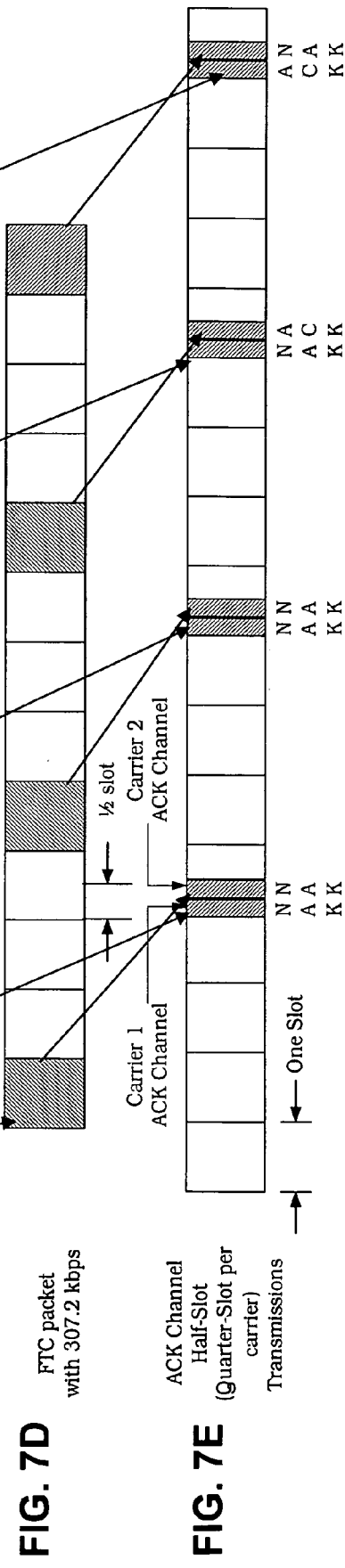
FIG. 7A FIG. 7B FIG. 7C FIG. 7D FIG. 7E

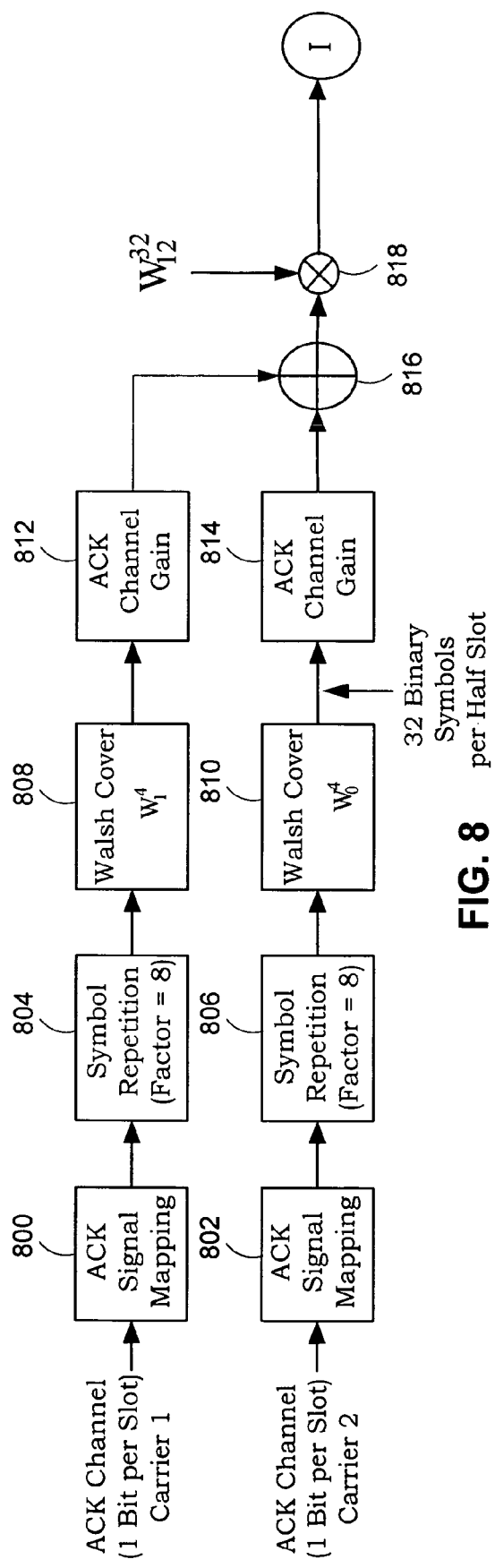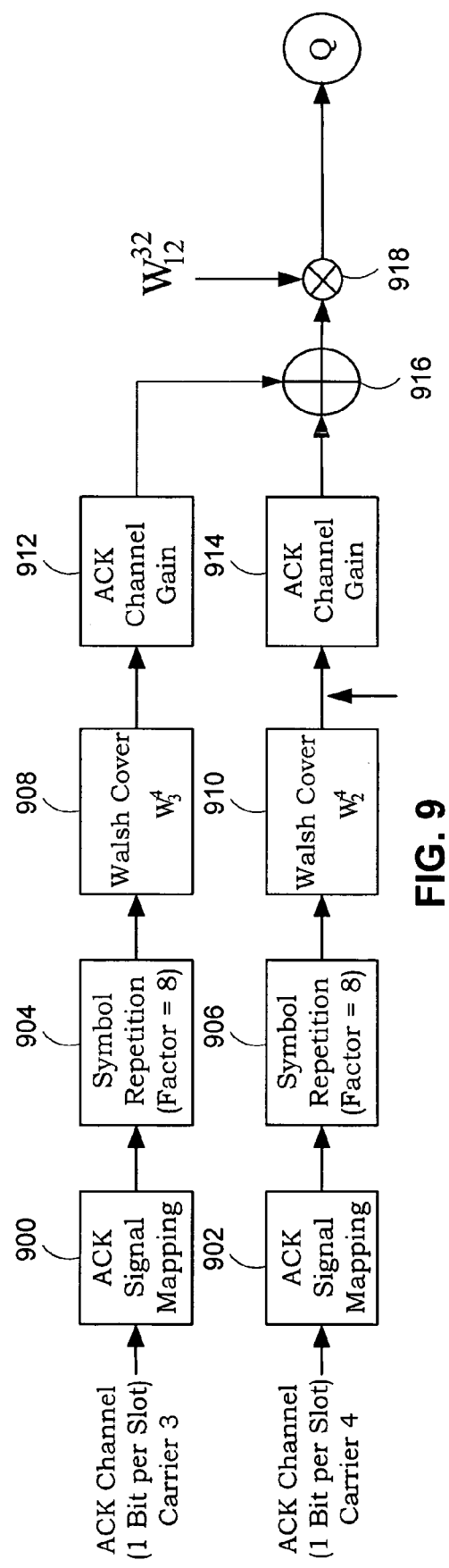
FIG. 8
FIG. 9

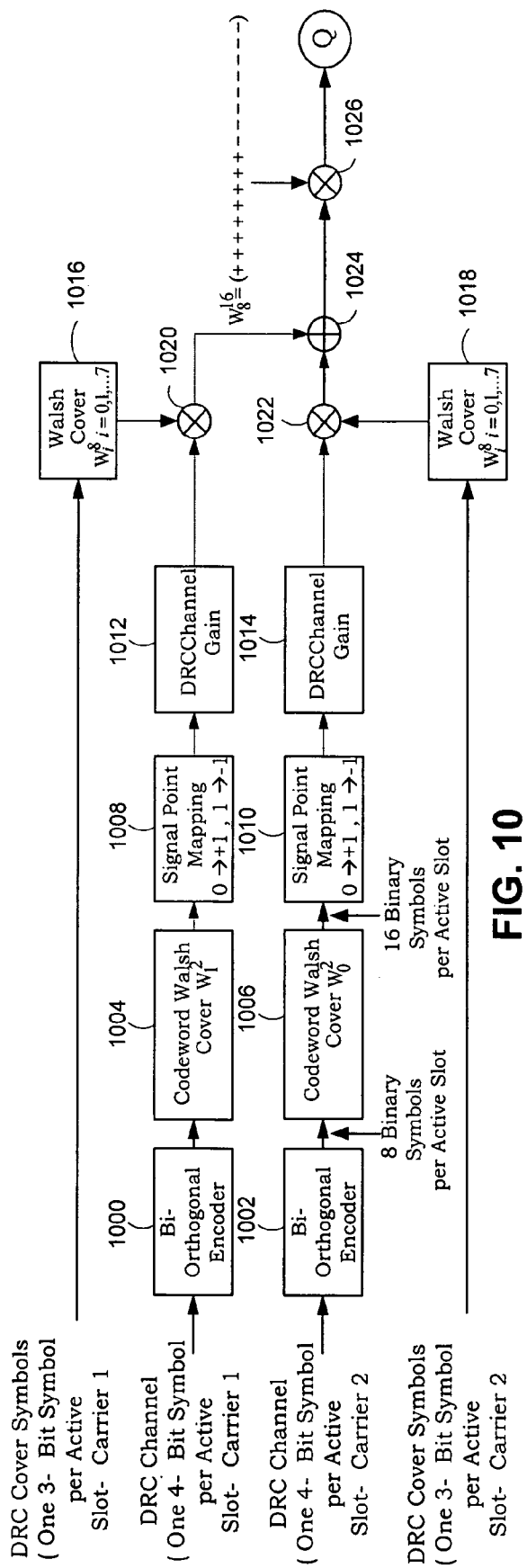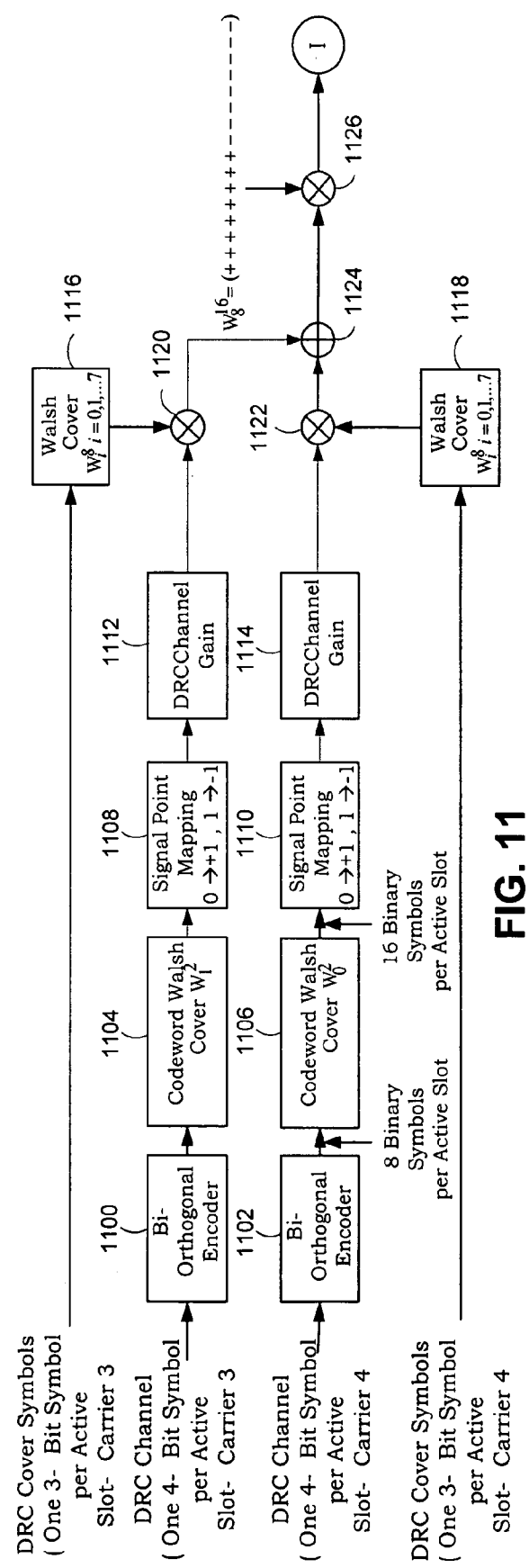
FIG. 10
FIG. 11

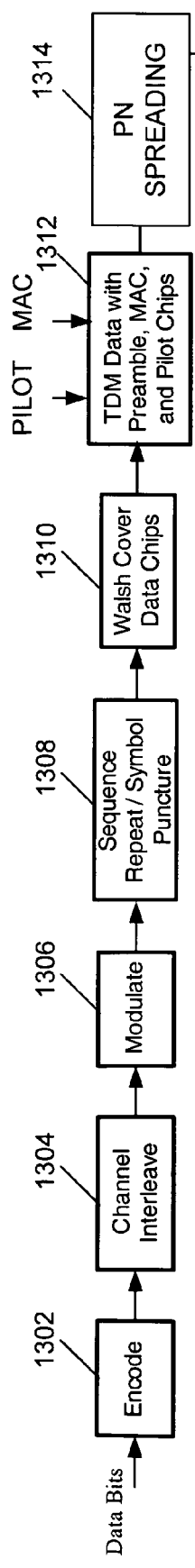
FIG. 13A TRANSMIT PROCESSING 1300
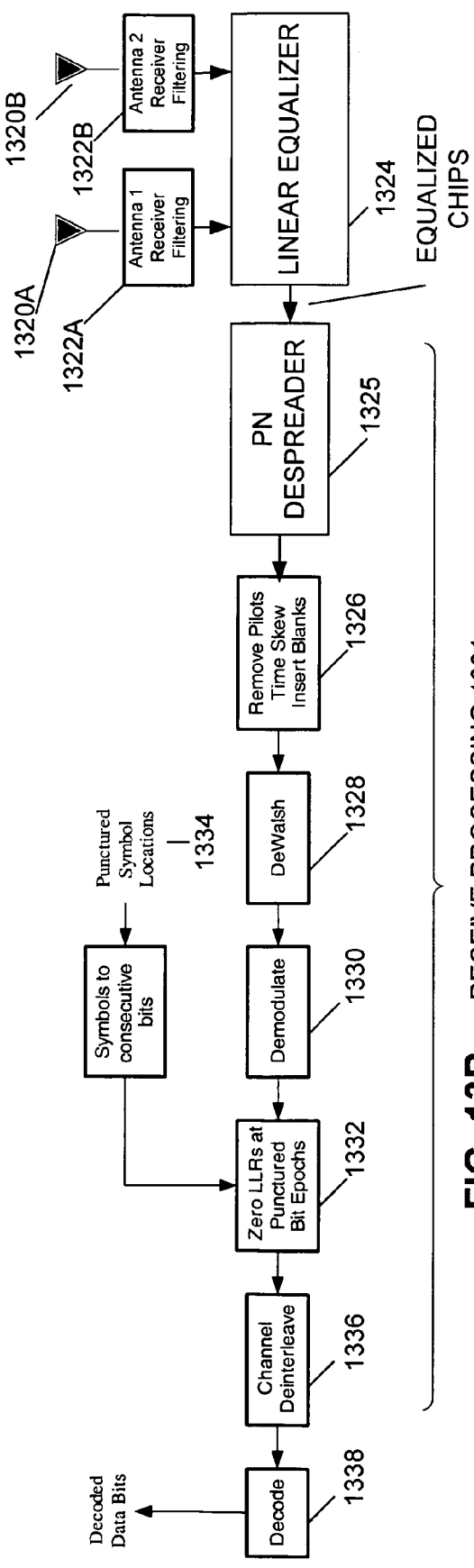
FIG. 13B RECEIVE PROCESSING 1301

ASYMMETRIC MODE OF OPERATION IN MULTI-CARRIER COMMUNICATION SYSTEMS

CLAIM OF PRIORITY UNDER 35 U.S.C. §119

The present application claims priority to co-assigned U.S. Provisional Application No. 60/701,206, entitled "Asymetric Mode of Operation in Multi-Carrier Communication Systems," filed on Jul. 20, 2005, and to co-assigned U.S. Provisional Application No. 60/709,944, entitled "Asymetric Mode of Operation in Multi-Carrier Communication Systems," filed on Aug. 18, 2005, both of which are incorporated herein by reference.

BACKGROUND

1. Field

The present invention generally relates to wireless communication systems and, in particular, to multi-carrier communication systems providing asymmetric modes of operation.

2. Background

A communication system may provide communication between a number of base stations and access terminals. Forward link or downlink refers to transmission from a base station to an access terminal. Reverse link or uplink refers to transmission from an access terminal to a base station. Each access terminal may communicate with one or more base stations on the forward and reverse links at a given moment, depending on whether the access terminal is active and whether the access terminal is in soft handoff.

Wireless communication systems are widely deployed to provide various types of communication (e.g., voice, data, etc.) to multiple users. Such systems may be based on code division multiple access (CDMA), time division multiple access (TDMA), frequency division multiple access (FDMA), or other multiple access techniques. CDMA systems offer some desirable features, including increased system capacity. A CDMA system may be designed to implement one or more standards, such as IS-95, cdma2000, IS-856, W-CDMA, TD-SCDMA, and other standards.

In response to the growing demand for multimedia services and high-rate data, multi-carrier modulation has been proposed in wireless communication systems. There remains, for example, a challenge to provide efficient and robust multi-carrier communication systems.

SUMMARY

A method and system for providing asymmetric modes of operation in multi-carrier wireless communication systems. In one mode, a method may assign a long code mask (LCM) to an information channel associated with a plurality of forward link carriers to transmit data from a base station or access network to an access terminal; and multiplex the information channel on a reverse link carrier. The information channel may include at least one of data source channel (DSC) information, data rate control (DRC) information and acknowledgment (ACK) information, and the multiplexing may be code division multiplexing (CDM). The access network may instruct the access terminal whether to multiplex the DSC information or not. In cases where a feedback from the access terminal goes to the same channel card and a serving sector is the same across multiple forward link carriers, the access network may instruct the access terminal not to multiplex the DSC information. The method may further offset the ACK information on the reverse link to reduce the reverse link peak to average. In another mode, a method may code division multiplex the information channel on an I-branch and on a Q-branch, and transmit the code division multiplexed information channel on the reverse link carrier. The DRC and ACK information may be covered with Walsh codewords, and the DRC information may be further combined with DRC cover symbols, which are offset by Walsh codes, on both the I-branch and the Q-branch.

Depending on the hardware, any combination of the modes may be supported. The first mode may achieve 15 forward link carriers and one reverse link carrier with 15 unique long code masks assigned to an access terminal. The first and second modes may also be combined to achieve 15 forward link carriers and one reverse link carrier with 4 unique long code masks assigned to an access terminal.

BRIEF DESCRIPTION OF DRAWINGS

The features, nature, and advantages of the present invention may be more apparent from the detailed description set forth below with the drawings. Like reference numerals and characters may identify the same or similar objects.

FIG. 2 illustrates an example of symmetric forward link and reverse link carrier assignment.

FIGS. 3A and 3B illustrate examples of asymmetric carrier assignment.

FIG. 4A illustrates an example of a data rate control (DRC) reverse link transmission for a single forward link carrier.

FIGS. 4B-4F illustrate examples of multi-carrier, time division multiplexed DRC.

FIGS. 7A and 7B illustrate an example of an access terminal sending two DRC channel transmit requests to a base station for two forward link carriers to transmit data at two different rates.

FIGS. 7C and 7D illustrate a base station transmitting forward traffic channel sub-packets on two forward link carriers at two different rates.

FIG. 7E illustrates an access terminal sending acknowledgements (ACK) and negative acknowledgements (NAK) on a single reverse link channel for the two forward link carriers.

FIGS. 8 and 9 illustrate processes and structures for asymmetric mode of multi-carrier ACK transmission.

FIGS. 10 and 11 illustrate processes and structures for asymmetric mode of multi-carrier DRC transmission.

FIG. 13A illustrates an example of a forward link transmit chain, structure or process, which may be implemented at a base station of FIG. 1.

FIG. 13B illustrates an example of a forward link receive chain, process or structure, which may be implemented at an access terminal of FIG. 1.

DETAILED DESCRIPTION

Any embodiment described herein is not necessarily preferable or advantageous over other embodiments. While various aspects of the present disclosure are presented in drawings, the drawings are not necessarily drawn to scale or drawn to be all-inclusive.

Figure 1:
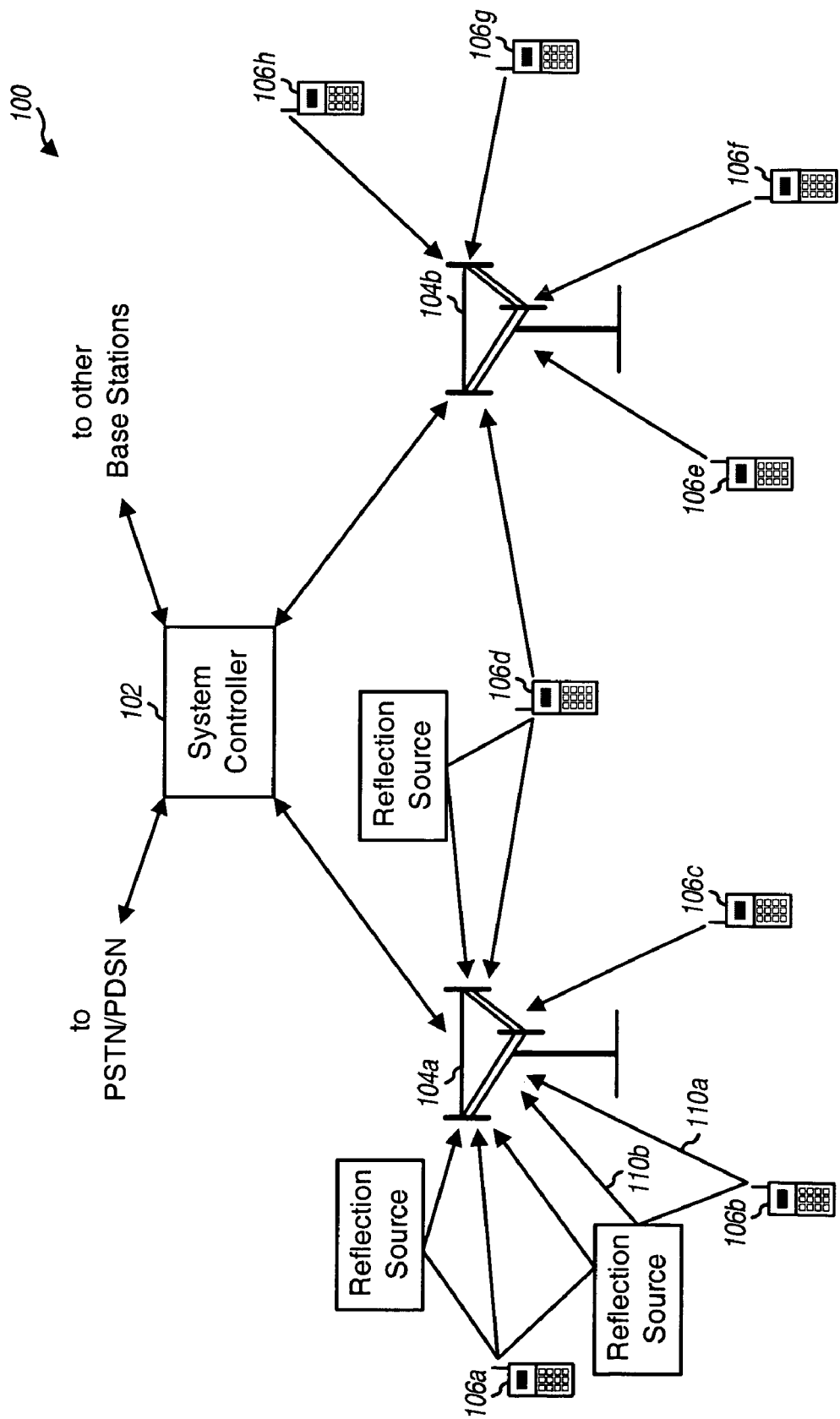
FIG. 1 illustrates a wireless communication system with base stations and access terminals.

FIG. 1 illustrates a wireless communication system 100, which includes a system controller 102, base stations (BSs) 104a-104b, and a plurality of access terminals (ATs) 106a-106h. The system 100 may have any number of controllers 102, base stations 104 and access terminals 106. Various aspects and embodiments of the present invention described below may be implemented in the system 100.

Access terminals 106 may be mobile or stationary and may be dispersed throughout the communication system 100 of FIG. 1. An access terminal 106 may be connected to or implemented in a computing device, such as a laptop personal computer. Alternatively, an access terminal may be a self-contained data device, such as a personal digital assistant (PDA). An access terminal 106 may refer to various types of devices, such as a wired phone, a wireless phone, a cellular phone, a laptop computer, a wireless communication personal computer (PC) card, a PDA, an external or internal modem, etc. An access terminal may be any device that provides data connectivity to a user by communicating through a wireless channel or through a wired channel, for example, using fiber optic or coaxial cables. An access terminal may have various names, such as mobile station (MS), access unit, subscriber unit, mobile device, mobile terminal, mobile unit, mobile phone, mobile, remote station, remote terminal, remote unit, user device, user equipment, handheld device, etc.

The system 100 provides communication for a number of cells, where each cell is serviced by one or more base stations 104. A base station 104 may also be referred to as a base station transceiver system (BTS), an access point, a part of an access network (AN), a modem pool transceiver (MPT), or a Node B. Access network refers to network equipment providing data connectivity between a packet switched data network (e.g., the Internet) and the access terminals 106.

Forward link (FL) or downlink refers to transmission from a base station 104 to an access terminal 106. Reverse link (RL) or uplink refers to transmission from an access terminal 106 to a base station 104.

A base station 104 may transmit data to an access terminal 106 using a data rate selected from a set of different data rates. An access terminal 106 may measure a signal-to-noise-and-interference ratio (SINR) of a pilot signal sent by the base station 104 and determine a desired data rate for the base station 104 to transmit data to the access terminal 106. The access terminal 106 may send data request channel or data rate control (DRC) messages to the base station 104 to inform the base station 104 of the desired data rate.

The system controller 102 (also referred to as a base station controller (BSC)) may provide coordination and control for base stations 104, and may further control routing of calls to access terminals 106 via the base stations 104. The system controller 102 may be further coupled to a public switched telephone network (PSTN) via a mobile switching center (MSC), and to a packet data network via a packet data serving node (PDSN).

The communication system 100 may use one or more communication techniques, such as code division multiple access (CDMA), IS-95, high rate packet data (HRPD), also referred to as high data rate (HDR), as specified in "cdma2000 High Rate Packet Data Air Interface Specification," TIA/EIA/IS-856, CDMA 1x evolution data optimized (EV-DO), 1xEV-DV, wideband CDMA (W-CDMA), universal mobile telecommunications system (UMTS), time division synchronous CDMA (TD-SCDMA), orthogonal frequency division multiplexing (OFDM), etc. The examples described below provide details for clarity of understanding. The ideas presented herein are applicable to other systems as well, and the present examples are not meant to limit the present application.

Multi-Carrier System

A "multi-carrier" system described herein may use frequency division multiplex, wherein each "carrier" corresponds to a radio frequency range. For example, a carrier may be 1.25 Megahertz wide, but other carrier sizes may be used. A carrier may also be called a CDMA carrier, a link or a CDMA channel.

Data flow requirements may be biased towards heavier usage of a forward or reverse link. The description below relates to de-coupling forward link and reverse link assignment in a multi-carrier wireless communication system. The system 100 may assign M forward links (or carriers) and N reverse links (or carriers) to an access terminal 106, where M and N may not be equal. The description below describes mechanisms for overhead channel transmissions to reduce reverse link overhead.

The base stations, BSCs or MSC may determine a number of FL carriers assigned for an access terminal. The base stations, BSCs or MSC may also change the number of FL carriers assigned for an access terminal depending on conditions, such as channel conditions, available data for the terminal, terminal power amplifier headroom, and application flows.

The access terminals 106 may run applications, such as Internet applications, video conferencing, movies, games, etc., which may use voice, image files, video clips, data files, etc., transmitted from the base stations 104. The applications may include two types:

1. Delay-tolerant, high forward link throughput and low reverse link throughput; and
2. Delay-sensitive, low forward link throughput and low reverse link throughput. Other types of applications may also exist.

If the system 100 uses multiple carriers on the forward link to achieve high throughput or maximize spectral efficiency, an access terminal 106 may avoid transmission on all associated carriers on the reverse link to improve reverse link efficiency.

For type 1 applications where a slower DRC update is acceptable, an access terminal 106 may:
a) transmit a continuous pilot signal on a primary reverse link carrier;
b) transmit data only on the primary reverse link carrier;
c) transmit DRC for each FL carrier as time-division multiplexed on the primary reverse link carrier, which assumes slower DRC channel update is acceptable; and
d) transmit acknowledgment (ACK) or negative acknowledgment (NAK) messages for each FL carrier as needed. An access terminal 106 can transmit a gated pilot (at the same power level as the pilot on the primary RL carrier) on secondary carriers when transmitting ACK channel, e.g., ½ slot skirt around ACK transmission for pilot filter warm-up.

For type 1 applications where a slower DRC update may not be not acceptable, an access terminal 106 may:
a) transmit a continuous pilot signal on all reverse link carrier(s) associated with enabled forward link carriers;
b) transmit data only on the primary reverse link carrier; and
c) transmit ACK for each FL carrier as needed.

For type 2 applications, an access terminal 106 may:
a) transmit a continuous pilot on the primary reverse link carrier;
b) transmit data only on the primary reverse link carrier;

c) transmit DRC for each FL carrier as time-division multiplexed on the primary reverse link carrier, which assumes slower DRC channel update is acceptable; and d) transmit ACK only on the primary reverse link carrier. A base station 104 may be constrained to ensure no more than one packet is in flight across all forward link carriers. A base station 104 can determine ACK association based on timing of transmitted FL packet.

Figure 14:
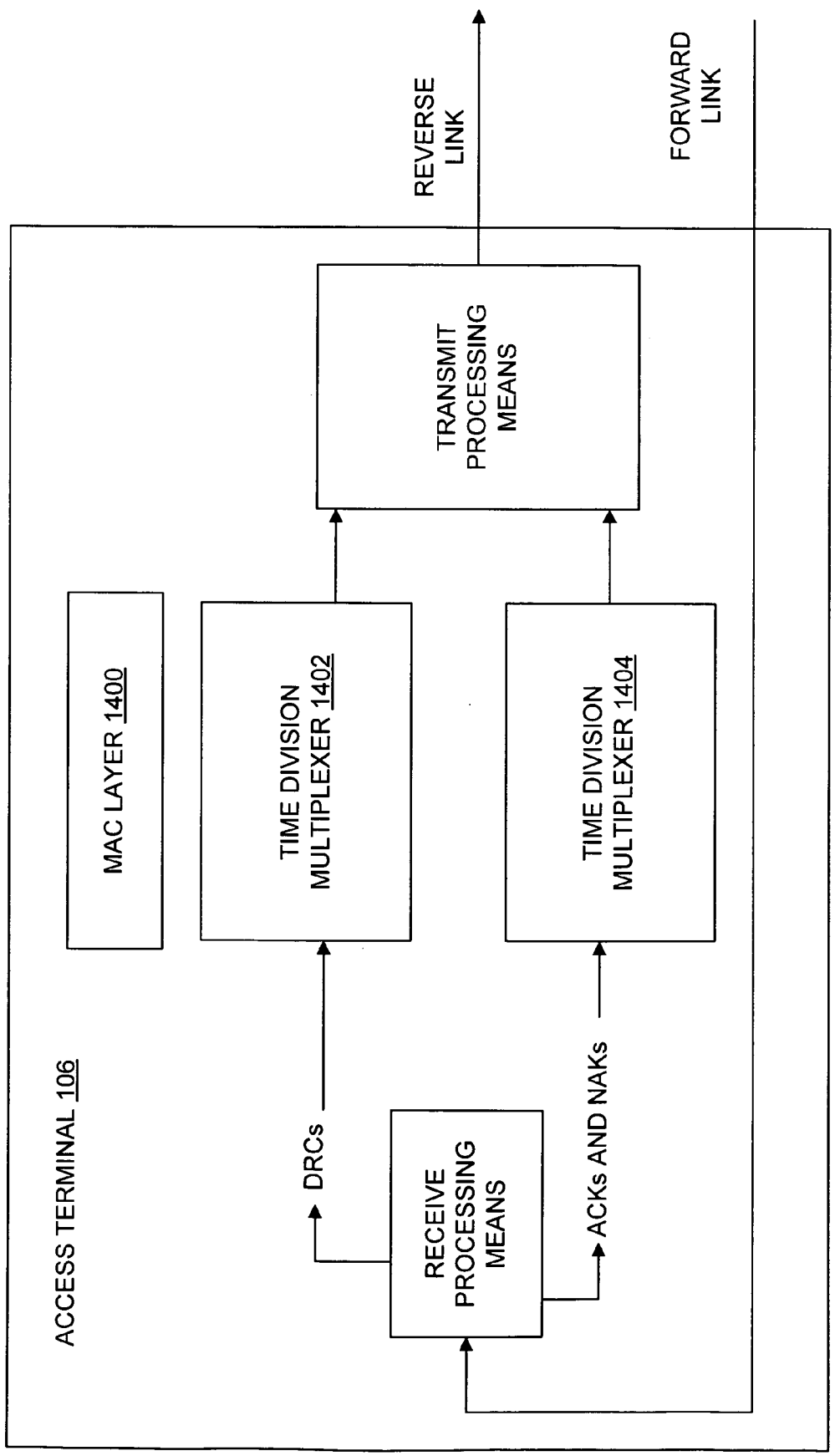
FIG. 14 illustrates some components of an access terminal of FIG. 1.

Alternatively, an access terminal 106 may perform an alternate form of ACK channel transmission:

a) reduce ACK channel transmit time interval if desired, e.g., if the system 100 supports additional FL carriers (in an EV-DO system, ACK may be transmitted in ½ slot);

b) ACK channel transmission for N forward link carriers within a single ½ slot;

c) ACK channel transmit interval is a function of number of enabled forward link carriers; and d) ACK channel transmissions on RL and FL association setup may be implemented via signaling in the medium access control (MAC) layer 1400 (FIG. 14).

Multi-Carrier Forward Traffic Channel Mac

There may be two modes of carrier assignment: symmetric carrier assignment and asymmetric carrier assignment.

FIG. 2 illustrates an example of symmetric carrier assignment with three forward link carriers 200A-200C, e.g., used for EV-DO data, and three corresponding reverse link carriers 202A-202C. Symmetric carrier assignment may be used for (a) applications with symmetric data rate requirements, and/or (b) applications with asymmetric data rate requirements supported on hardware that enforces symmetric FL/RL operation.

FIGS. 3A and 3B illustrate examples of asymmetric carrier assignment. FIG. 3A shows three forward link carriers 300A-300C and one corresponding reverse link carrier 302. FIG. 3B shows three forward link carriers 300A-300C, and two corresponding reverse link carriers 304A and 304B. Asymmetric carrier assignment may be used for applications with asymmetric data rate requirements such as file transfer protocol (FTP) download. Asymmetric carrier assignment may have (a) reduced reverse link overhead and (b) MAC channels that allow forward link traffic (FLT) carrier assignment to be separate from reverse power control (RPC) carrier assignment.

Asymmetric Forward and Reverse Link Assignment—Multi-Carrier DRC

An access terminal 106 may time-division multiplex DRC channel transmission for multiple forward link carriers on a single reverse link carrier.

FIG. 14 illustrates a time division multiplexer 1402 for multiplexing DCR information in an access terminal 106 of FIG. 1.

A MAC layer 1400 (FIG. 14) in the access terminal 106 may provide DRC-to-forward-link association based on DRC transmit time. The number of forward link carriers (for which DRC transmissions are indicated by a single reverse link carrier) may depend on: (i) a maximum acceptable DRC span, which is a time interval required for transmission of DRC for all assigned forward link carriers, e.g., DRC span=max (16 slots, DRCLength (per carrier)×number of carriers); and (ii) number of carriers supported by hardware, such as a 1xEV-DO Rev A channel card. In one embodiment, four FL carriers are associated with a single RL carrier, which may be limited by sending ACKs for the four FL carriers.

In another embodiment, an access terminal 106 may use a single DRC channel across all carriers. In other words, an access terminal 106 sends a single DRC to a base station 104 for all designated FL carriers to transmit data at the DRC-designated rate to that access terminal 106.

In another embodiment, an access terminal 106 may use a combination of (a) a single DRC channel across multiple carriers (same DRC for some FL carriers of the total number of FL carriers) and (b) time-division multiplexed DRC channel.

Figures 4A, 4B, 4C:
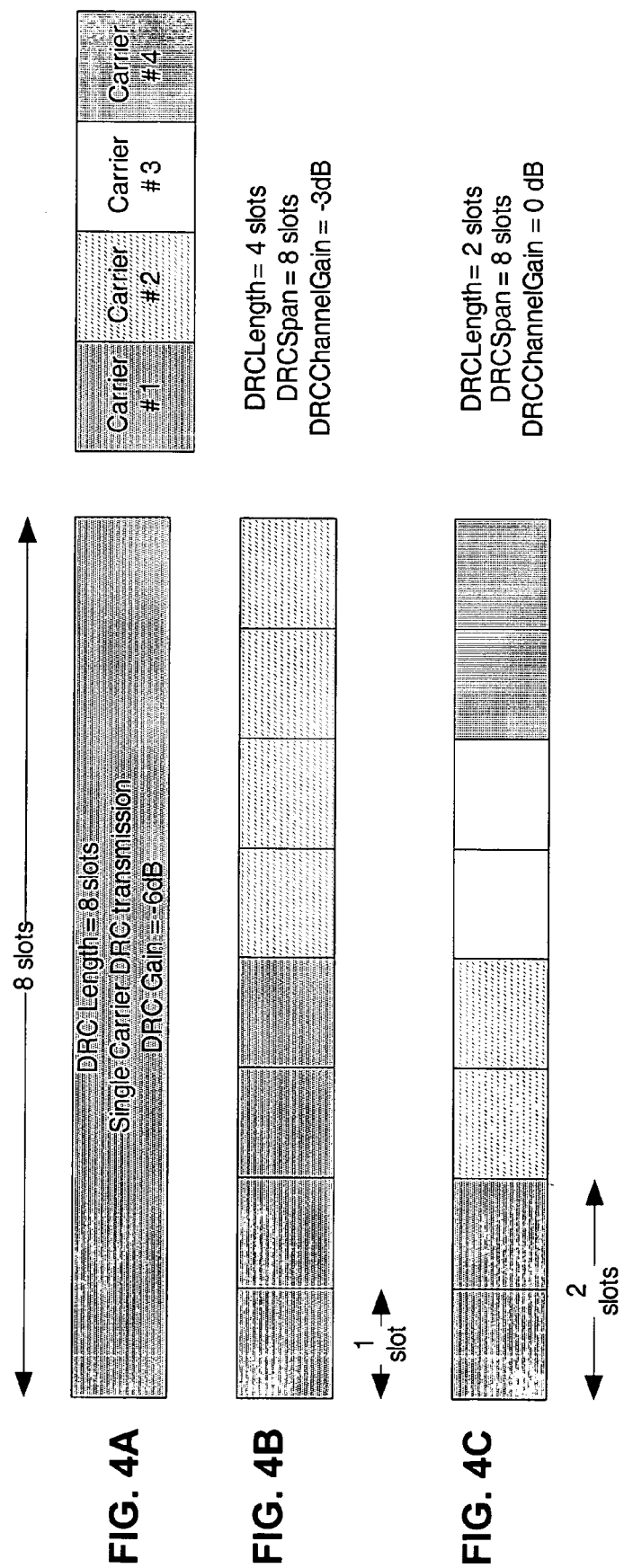

FIG. 4A illustrates an example of a DRC reverse link transmission (DRC length=8 slots), which requests a data transmit rate for a single forward link carrier to use. FIGS. 4B-4F illustrate examples of multi-carrier, time division multiplexed DRC. Specifically, FIG. 4B shows an example of two DRCs (DRC length=4 slots each; DRC span=8 slots) transmitted on a single reverse link carrier for two forward link carriers. FIG. 4C shows an example of four DRCs (DRC length=2 slots each; DRC span=8 slots) transmitted on a single reverse link carrier for four forward link carriers.

FIG. 4D illustrates an example of two interlaced DRCs (DRC length=4 slots each; DRC span=8 slots) transmitted on a single reverse link carrier for two forward link carriers. Interlaced DRC channel transmission may provide additional time diversity for a given DRCLength. FIG. 4E shows an example of four interlaced DRCs (DRC length=4 slots each; DRC span=16 slots) transmitted on a single reverse link carrier for four forward link carriers. FIG. 4F shows an example of four interlaced DRCs (DRC length=2 slots each; DRC span=8 slots) transmitted on a single reverse link carrier for four forward link carriers.

Asymmetric Forward and Reverse Link Assignment—Multi-Carrier ACK

Figure 5:
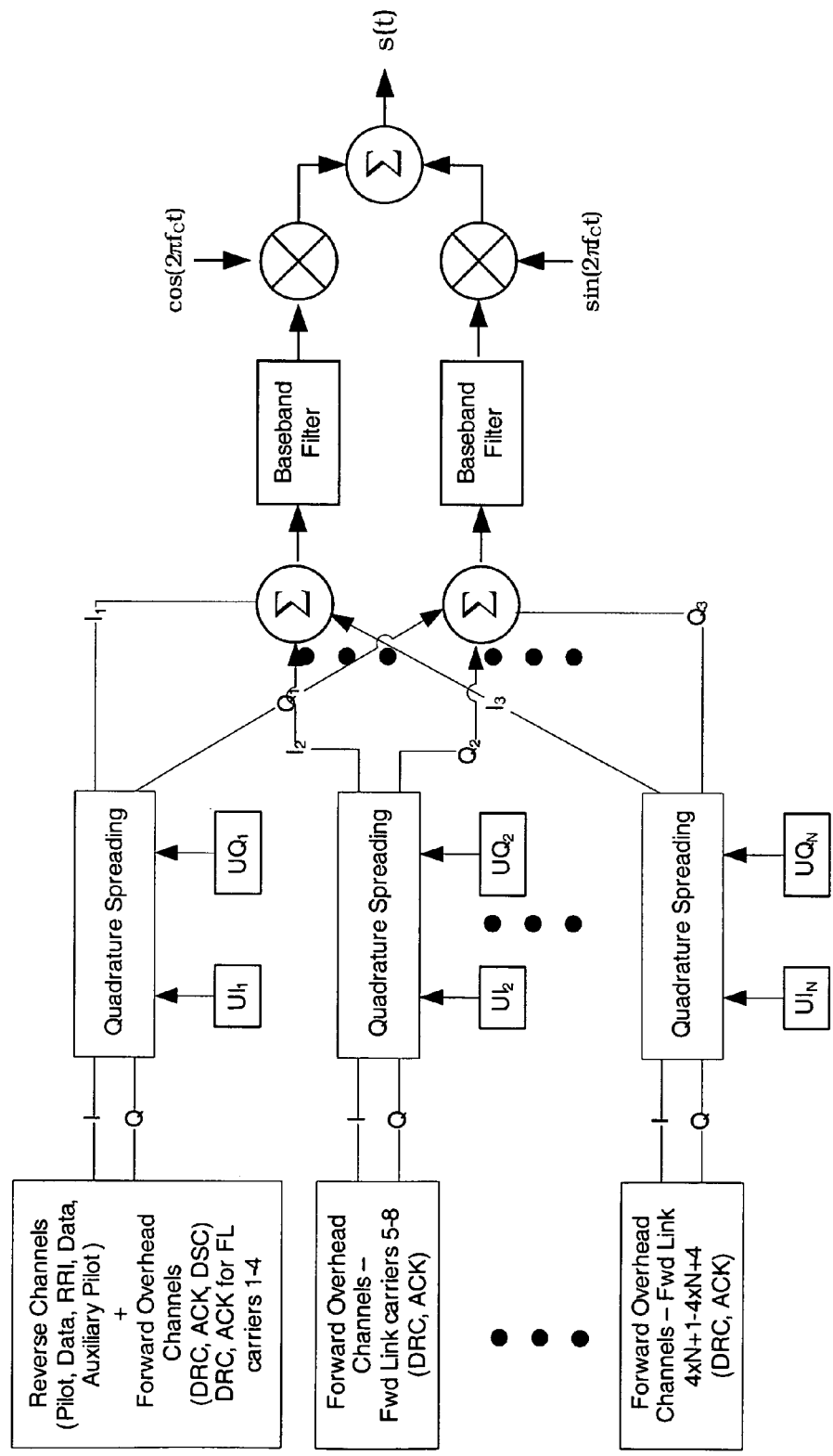
FIG. 5 illustrates a block diagram of a module that may be used to transmit DRC and ACK channels for additional FL carriers on a primary RL using a separate long code mask.

In one embodiment or mode of multi-carrier communication operation, when the number of forward link channels is greater than the number of reverse link channels, the DSC, DRC and ACK channels associated with a plurality of forward link channels may be multiplexed onto a single reverse link carrier. In this embodiment or mode, a long code mask (LCM) may be used to facilitate such multiplexing. With this embodiment or mode, the AN may instruct the AT whether to multiplex the DSC or not. In cases where a feedback from the AT goes to the same channel card and a serving sector is the same across multiple forward link carriers, the AN may instruct the AT not to multiplex the DSC. In particular, a unique long code mask may be used to transmit DRC and ACK channels for secondary forward link carriers. Referring to FIG. 5, there is shown a block diagram of a module that may be used to transmit DRC and ACK channels for additional forward link carriers on a primary reverse link using a separate long code mask. As a result, the reverse link peak to average may be reduced by use of offset ACK channels.

Figure 6:
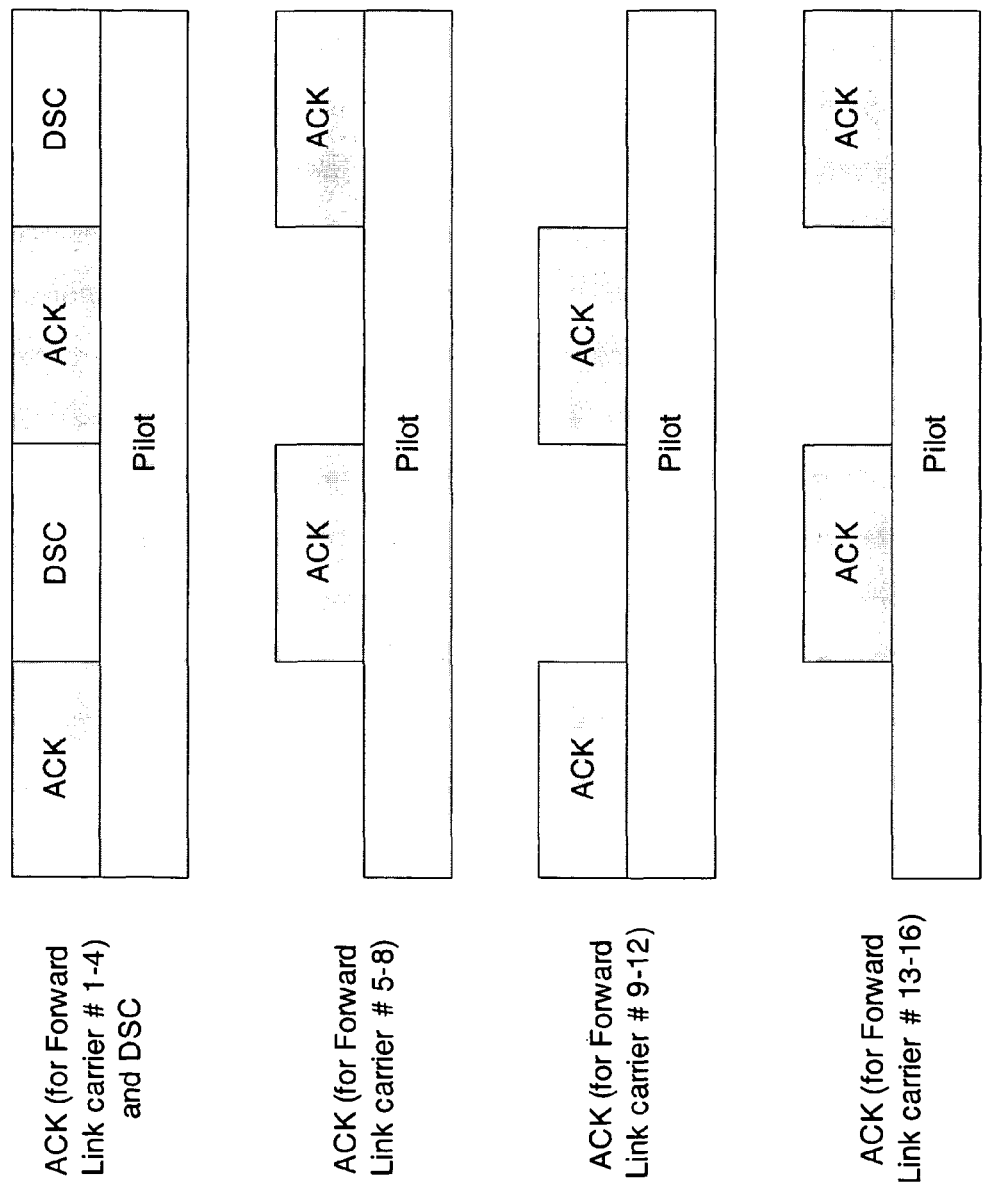
FIG. 6 illustrates peak to average reduction in asymmetric mode of operation and using long code mask.

Referring to FIG. 6, there is illustrated a peak to average reduction in asymmetric mode of operation of using, for example, more than one long code mask. In particular, a DSC channel may be transmitted per AT as opposed to per carrier. Because the reverse link peak to average reduction may be adversely affected by ACK channel transmission for the secondary forward link carriers (e.g., multiple ACK channels may become overlapping on a power vs. time plot), the DSC channel may be used to transmit half-slot for ACK channel transmission for the secondary forward link carriers, thereby offsetting the ACK channel transmission as illustrated in FIG. 6. As a result, the forward link demodulation and decoding time for multi-carrier ATs may be reduced for some fraction of assigned forward link carriers.

Reverse link peak to average reduction is further illustrated in FIGS. 7A-7E. More specifically, an access terminal 106 may time division multiplex ACK channel transmission for multiple forward link carriers on a single reverse link carrier, as explained below with FIG. 7E. FIG. 14 illustrates a time division multiplexer 1404 for multiplexing ACK information in an access terminal 106 of FIG. 1.

Per carrier ACK channel transmission may be reduced, for example, from 1 slot to ¼ slot (each ACK transmitted for ¼ slot) (instead of ½ slot used in EV-DO Rev. A), which may depend on a number of FL carriers for which ACK channel is transmitted. The MAC layer 1400 (FIG. 14) at the access terminal 106 may provide ACK-to-forward-link association based on ACK transmit time.

FIGS. 7A and 7B show an example of two DRC channel transmit requests sent from an access terminal 106 to a base station 104 for two forward link carriers (carriers 1 and 2) to transmit FL data at two different rates (e.g., 153.6 and 307.2 kbps). FIGS. 7A and 7B may show the DRCs decoded by the base station 104, but FIGS. 7A and 7B do not indicate the method with which the DRCs are time division multiplexed on a single Reverse Link carrier, as in FIGS. 4B-4F.

In response to the DRCs, the base station 104 transmits forward traffic channel (FTC) sub-packets on the two forward link carriers at the two different rates (e.g., 153.6 and 307.2 kbps) in FIGS. 7C and 7D.

The base station 104 may repeat and process data bits of an original data packet into a plurality of corresponding "sub-packets" to transmit to the access terminal 106. If the access terminal 106 experiences a high signal-to-noise ratio signal, the first sub-packet may contain sufficient information for the access terminal 106 to decode and derive the original data packet. If the access terminal 106 experiences fading or a low signal-to-noise-ratio signal, the access terminal 106 may have a relatively low probability of correctly decoding and deriving the original data packet from only the first sub-packet.

If the access terminal 106 does not successfully decode the first sub-packet, the access terminal 106 sends a NAK to the base station 104. The base station 104 then sends a second sub-packet. The access terminal 106 may combine information from the first and second sub-packets to try to decode the original data packet. As the access terminal 106 receives more sub-packets and combines information derived from each received sub-packet, the probability of decoding and deriving the original data packet increases.

In FIG. 7C, a base station 104 sends a first sub-packet of an original data packet to the access terminal 106 in slot 1 of carrier 1. Simultaneously, in FIG. 7D, the base station 104 sends a first sub-packet of another original data packet to the access terminal 106 in slot 1 of carrier 2.

The access terminal 106 tries to decode the two original data packets from the received first sub-packets on carriers 1 and 2, respectively. The access terminal 106 cannot correctly decode the received first sub-packet on carrier 1; sends a NAK on the ACK channel to the base station 104 in FIG. 7E; cannot correctly decode a received second sub-packet on carrier 1; sends a NAK on the ACK channel to the base station 104; cannot correctly decode a received third sub-packet on carrier 1; sends a NAK on the ACK channel to the base station 104; correctly decodes a received fourth sub-packet on carrier 1; and sends an ACK on the ACK channel to the base station 104.

Also in FIG. 7E, the access terminal 106 cannot correctly decode the first and second received sub-packets on carrier 2 and sends NAKs to the base station 104. The access terminal 106 correctly decodes the original second packet (e.g., using a cyclic redundancy check (CRC) or other error detection technique) after receiving and processing the third sub-packet on slot 3 of carrier 2. The access terminal 106 sends an acknowledgement (ACK) signal to the base station 104 to not send a fourth sub-packet for the second original packet on carrier 2.

The base station 104 can then send a first sub-packet of a next packet in slot 1 (n+12) of carrier 2. In FIG. 7E, the access terminal 106 sends ACKs and NAKs on a single ACK/NAK RL channel for the two FL carriers (½ slot ACK/NAK channel transmissions with a ¼ slot per FL carrier).

In another embodiment of a multi-carrier ACK, an access terminal 106 may use a single RL ACK channel, where RL ACK is associated with FL based on timing of packet reception (also called transmit-time-based-ACK-channel association). This may be used for Voice over Internet Protocol (VoIP)-type traffic. Transmit-time-based-ACK-channel association may add a constraint on a FL scheduler to limit transmission on a single FL carrier to a given access terminal 106 at a time.

Enhanced Multi-Carrier ACK

In another embodiment of asymmetric mode for multi-carrier operation, FIGS. 8 and 9 illustrate processes and structures for multi-carrier ACK and cover transmission. With this mode, there may be 4 ACK channels for 4 forward link carriers per long code mask, e.g., to transmit ACK on a single reverse link carrier using code division multiplex (CDM) transmission on the I-branch and the Q-branch. Different Walsh covers may be used, e.g., to orthogonalize the I-branch and the Q-branch. In particular, FIG. 8 shows a process and structure for preparing multi-carrier ACK transmissions. A first and second ACK Signal Mapping blocks 800 and 802 map or encode ACK Channel carriers 1 and 2, respectively (1 bit per slot). Symbol Repetition blocks 804 and 806 then repeat a plurality of symbols per half-slot. After repetition, the symbols are channelized by Walsh code/cover $W_1^4$ and $W_0^4$ at Walsh Cover blocks 808 and 810, respectively, to produce 32 binary symbols per half-slot. Gain is then applied to each of the half-slots at ACK Channel Gain blocks 812 and 814. The gains of the half-slots are combined at 816 and a multiplier 818 then applies a Walsh covering/code $W_{12}^{32}$ to indicate an ACK channel for the I-phase.

Similarly to FIG. 8, FIG. 9 illustrates a process and structure for multi-carrier ACK and cover transmission for ACK Channel carriers 3 and 4. A third and fourth ACK Signal Mapping blocks 900 and 902 map or encode ACK Channel carriers 3 and 4, respectively (1 bit per slot). Symbol Repetition blocks 904 and 906 then repeat a plurality of symbols per half-slot. After repetition, the symbols are channelized by Walsh code/cover $W_3^4$ and $W_2^4$ at Walsh Cover blocks 908 and 910, respectively, to produce 32 binary symbols per half-slot. Gain is then applied to each of the half-slots at ACK Channel Gain blocks 912 and 914. The gains of the half-slots are combined at 916 and a multiplier 918 then applies a Walsh covering/code $W_{12}^{32}$ to indicate an ACK channel for the Q-phase.

In yet another embodiment of asymmetric mode for multi-carrier operation, FIG. 10 illustrates a process and structure for preparing enhanced multi-carrier DRC channels for transmission. In this mode, there may be 4 DRC channels (one per forward link carrier) per long code mask, e.g., to transmit DRC rate on a single reverse link carrier using code division multiplex transmission on the I-branch and the Q-branch. For DRC transmissions using the same Codeword Walsh cover, the DRC cover value for one forward carrier may be offset relative to that of the other forward carrier such that the DRC covers are distinct. For example, if carrier # 1 uses DRC cover=0x 1, carrier # 3 may use a DRC cover value offset relative to 0x 1.

More specifically, referring to FIG. 10, a first and a second Bi-Orthogonal Encoders 1000 and 1002 encode DRC channels (e.g., one 4-bit symbol per active slot) for each of carriers 1 and 2, respectively, and produce 8 binary symbols per active slot. Each of codeword Walsh covers $W_1^2$ and $W_0^2$ in cover blocks 1004 and 1006, respectively, then produces 16 binary symbols per active slot. A first and a second signal point mapping blocks 1012 and 1014 then map 0s and 1s to +1 and −1 per actively slot, respectively. After gain is applied to each of the slots at DRC Channel Gain blocks 1012 and 1014, multipliers 1020 and 1022 then combine the output of gains 1012 and 1014, respectively, with DRC Cover Symbols (e.g., one 3-bit symbol per active slot) for carriers 1 and 2, respectively.

In another embodiment of asymmetric mode for multi-carrier operation, the DRC Cover Symbols for carriers 1 and 2 are channelized by Walsh cover blocks ($W_i^8$ (i=0,1, ... 7)) 1016 and 1018, respectively. The output of multipliers 1020 and 1022 are then added at 1024, which are then multiplied at 1026 applying a Walsh covering code $W_8^{16}$ to indicate a DRC channel for the Q-phase.

Similarly to FIG. 10, FIG. 11 illustrates a process and structure for preparing enhanced multi-carrier DRC channels for transmission for carriers 3 and 4. A third and a fourth Bi-Orthogonal Encoders 1100 and 1102 encode DRC channels (e.g., one 4-bit symbol per active slot) for each of carriers 3 and 4, respectively, and produce 8 binary symbols per active slot. Each of codeword Walsh covers $W_1^2$ and $W_0^2$ in codeword cover blocks 1104 and 1106, respectively, then produces 16 binary symbols per active slot. A first and a second signal point mapping blocks 1112 and 1114 then maps 0s and 1s to +1 and −1 per actively slot, respectively. After gain is applied to each of the slots at DRC Channel Gain blocks 1112 and 1114, multipliers 1020 and 1022 then combine the output of gains 1112 and 1114, respectively, with DRC Cover Symbols (e.g., one 3-bit symbol per active slot) for carriers 3 and 4, respectively.

In another embodiment of asymmetric mode for multi-carrier operation, the DRC Cover Symbols for carriers 3 and 4 are channelized by Walsh cover blocks ($W_i^8$ (i=0,1, ... 7)) at cover blocks 1116 and 1118, respectively. The output of multipliers 1120 and 1122 are then added at 1124, which are then multiplied at 1126 applying a Walsh covering code $W_8^{16}$ to indicate a DRC channel for the I-phase.

It is appreciated that in any of the above-described embodiments of asymmetric mode for multi-carrier operation, the ACK and DRC channels may be transmitted for up to four (4) forward link carriers on a single reverse link carrier using code division multiplex transmission on the I-branch and the Q-branch. In the event that the there are equal numbers of forward link and reverse link channels, the aforementioned scheme may also allow an AT to autonomously turn off the pilot and traffic channels, e.g., on some reverse link frequencies on which the AT chooses not to transmit (e.g., when the AT is short of transmission power headroom). Furthermore, for DRC transmissions using the same codeword Walsh cover, the DRC cover value for one forward carrier may be offset relative to that of the other forward link carrier. Stated another way, with this aspect of the invention, the ACK and DRC channels may be transmitted for the first 4-carriers using I/Q phases (in-phase (I), quadrature (Q)) of Walsh code W(16,8) and I/Q-phases of W(16,8). If additional DRC channel transmissions are required for additional FL carriers, the access terminal 106 can use ½ slot DRC on each of the phases of W(16,8). Thus, the access terminal 106 may support DRCs for up to 4 FL carriers with a single RL carrier.

Figure 12:
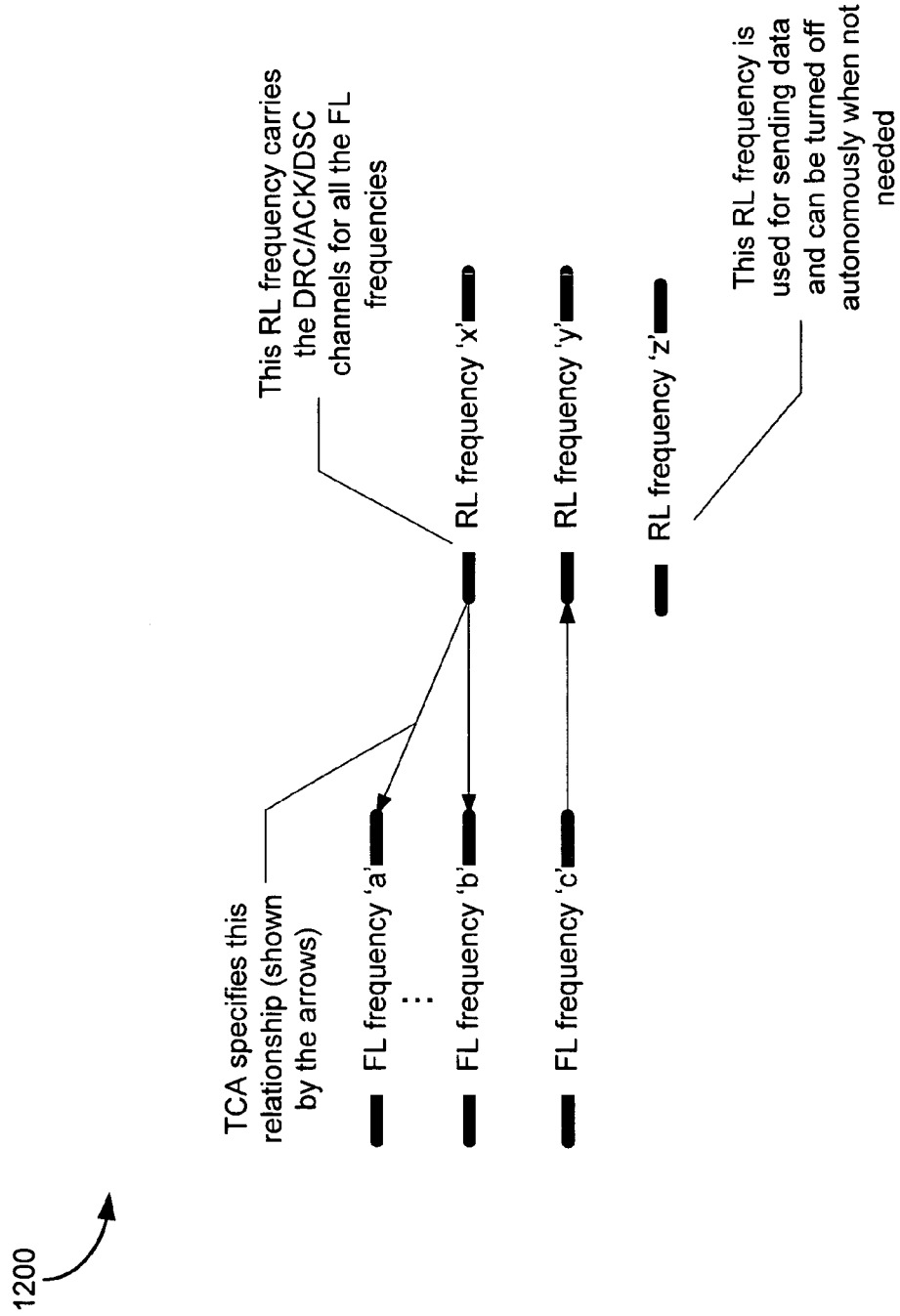
FIG. 12 illustrates a correspondence between the forward link and the reverse link frequencies in a multi-carrier system.

Referring to FIG. 12, there is shown a correspondence between the forward link and reverse link frequencies in a multi-carrier system. Traffic channel assignment (TCA) may specify such relationship. By way of example, the reverse link frequency "x" may be designated to carry the DSC, DRC and ACK channels for all the forward link frequencies.

In one aspect of the invention, a plurality of (e.g., up to four) additional long code masks may be created for each reverse link frequency using the four (4) most significant bits (MSBs) of the long code mask. In particular, a channel on which the feedback (ACK/DRC) is sent may be identified by a 4-bit identifier, e.g., <LongCodeMaskIndex (2 bits), FeedbackWalshCover (1 bit), IQIdentifier (1 bit)>, may be specified in the TCA.

In another aspect, an AT may set the long code masks for the reverse traffic channel (e.g., $MI_{RTCMAC}$ and $MQ_{RTCMAC}$) as follows. For example, a 42-bit mask $MI_{RTCMAC}$ associated with each LongcodeMaskIndex may be specified as shown in Table I below:

TABLE I

Reverse Traffic Channel Long Code Masks

| BIT | 41 | 40 | 39 | 38 | 37 | 36 | 35 | 34 | 33 | 32 | 31 | 30 | 29 | 28 | 27 | 26 | 25 | 24 | 23 | 22 | 21 |
|---|---|---|---|---|---|---|---|---|---|---|---|---|---|---|---|---|---|---|---|---|---|
| $MI_{RTCMAC}$ | | | 1 | 1 | 1 | 1 | 1 | 1 | 1 | 1 | | | | | | | | | | | |

LongCodeMaskIndex

| BIT | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|
| $MI_{RTCMAC}$ | Permuted ($ATI_{LCM}$) | | | | | | | | | | | | | | | | | | | | |

An AN may assign one or more long code masks to an AT on each of the channels on which the AT may transmit. The long code mask for each of the channels may be identified, e.g., by the value of the LongCodeMaskIndex which is a public data of the Route Update Protocol.

In Table I, Permuted ($ATI_{LCM}$) may be defined as follows:

$$ATI_{LCM} = (A_{31}, A_{30}, A_{29}, \ldots, A_0)$$

$$\text{Permuted } (ATI_{LCM}) =$$
$$(A_0, A_{31}, A_{22}, A_{13}, A_4, A_{26}, A_{17}, A_8, A_{30}, A_{21}, A_{12},$$
$$A_3, A_{25}, A_{16}, A_7, A_{29}, A_{20}, A_{11}, A_2, A_{24}, A_{15}, A_6,$$
$$A_{28}, A_{19}, A_{10}, A_1, A_{23}, A_{14}, A_5, A_{27}, A_{18}, A_9).$$

The 42-bit mask $MQ_{RTCMAC}$ may be derived from the mask $MI_{RTCMAC}$ as follows:

$$MQ_{RTCMAC}[k] = MI_{RTCMAC}[k-1], \text{ for } k = 1, \ldots, 41$$

$$\begin{aligned}MQ_{RTCMAC}[0] = \\ MI_{RTCMAC}[0] \oplus MI_{RTCMAC}[1] \oplus MI_{RTCMAC}[2] \oplus MI_{RTCMAC}[4] \oplus \\ MI_{RTCMAC}[5] \oplus MI_{RTCMAC}[6] \oplus MI_{RTCMAC}[9] \oplus MI_{RTCMAC}[15] \oplus \\ MI_{RTCMAC}[16] \oplus MI_{RTCMAC}[17] \oplus MI_{RTCMAC}[18] \oplus MI_{RTCMAC}[20] \oplus \\ MI_{RTCMAC}[21] \oplus MI_{RTCMAC}[24] \oplus MI_{RTCMAC}[25] \oplus MI_{RTCMAC}[26] \oplus \\ MI_{RTCMAC}[30] \oplus MI_{RTCMAC}[32] \oplus MI_{RTCMAC}[34] \oplus MI_{RTCMAC}[41]\end{aligned}$$

where the $\oplus$ denotes the Exclusive OR operation, and $MQ_{RTCMAC}[i]$ and $MI_{RTCMAC}[i]$ denote the $i^{th}$ least significant bits of $MQ_{RTCMAC}$ and $MI_{RTCMAC}$, respectively.

Forward Link Soft-Combining Mode

An access terminal 106 may use multi-carrier DRC with a forward link soft-combining mode (soft-combining data received across multiple FL carriers). In this mode, the base station 104 does not have to transmit the packets on the individual forward links at the same time, i.e., the design would support soft handoff across carriers with asynchronous transmissions. An access terminal 106 may indicate a DRC index based on transmission to the access terminal 106 in a given slot on multiple FL carriers by the same base station 104.

In one embodiment, the system or network 100 may use general attribute update protocol (GAUP) to indicate that all packet transmissions to a given terminal 106 will be multi-carrier transmissions for some length of time. The access terminal 106 may, until instructed otherwise, transmit a DRC based on a combined SINR prediction. The MAC layer 1400 (FIG. 14) may provide signal mapping.

The network may have some flexibility to serve the access terminal 106 using one carrier or a combination of carriers in that same time interval. This may use individual DRCs per carrier as well as DRCs based on a combined SINR prediction. The network may configure the access terminal 106 to operate in one of these two modes of DRC reporting. The forward link soft-combining mode may be used, for example, when the access terminal 106 experiences poor channel conditions for VoIP flows or for all types of flows.

FIG. 13A illustrates an example of a forward link transmit chain, structure or process, which may be implemented at a base station 104 of FIG. 1. The functions and components shown in FIG. 13A may be implemented by software, hardware, or a combination of software and hardware. Other functions may be added to FIG. 13A in addition to or instead of the functions shown in FIG. 13A.

In block 1302, an encoder encodes data bits using one or more coding schemes to provide coded data chips. Each coding scheme may include one or more types of coding, such as cyclic redundancy check (CRC), convolutional coding, Turbo coding, block coding, other types of coding, or no coding at all. Other coding schemes may include Automatic Repeat Request (ARQ), Hybrid ARQ, and incremental redundancy repeat techniques. Different types of data may be coded with different coding schemes.

In block 1304, an interleaver interleaves the coded data bits to combat fading. In block 1306, a modulator modulates coded, interleaved data to generate modulated data. Examples of modulation techniques include binary phase shift keying (BPSK) and quadrature phase shift keying (QPSK).

In block 1308, a repeater may repeat a sequence of modulated data or a symbol puncture unit may puncture bits of a symbol. In block 1310, a spreader (e.g., multiplier) may spread the modulated data with a Walsh cover (i.e., Walsh code) to form data chips.

In block 1312, a multiplexer may time-division multiplex the data chips with pilot chips and MAC chips to form a stream of chips. In block 1314, a pseudo random noise (PN) spreader may spread the stream of chips with one or more PN codes (e.g., short code, long code). The forward link modulated signal (transmitted chips) is then transmitted via an antenna over a wireless communication link to one or more access terminals 106.

FIG. 13B illustrates an example of a forward link receive chain, process or structure, which may be implemented at an access terminal 106 of FIG. 1. The functions and components shown in FIG. 13B may be implemented by software, hardware, or a combination of software and hardware. Other functions may be added to FIG. 13B in addition to or instead of the functions shown in FIG. 13B.

One or more antennas 1320A-1320B receives the forward link modulated signals from one or more base stations 104. Multiple antennas 1320A-1320B may provide spatial diversity against deleterious path effects such as fading. Each received signal is provided to a respective antenna receiver filtering block 1322, which conditions (e.g., filters, amplifies, downconverts) and digitizes the received signal to generate data samples for that received signal.

A cascaded adaptive linear equalizer 1324 receives data samples and generates equalized chips to block 1325. Block 1325 may despread the samples with one or more PN codes used in block 1314. Block 1326 may remove pilots time skew and insert blanks. In block 1328, a despreader may deWalsh, i.e., despread or remove Walsh codes from the received data samples, with the same spreading sequence used to spread the data in block 1310 at the base station.

In block 1330, a demodulator demodulates the data samples for all received signals to provide recovered symbols. For cdma2000, demodulation tries to recover a data transmission by (1) channelizing the despread samples to isolate or channelize the received data and pilot onto their respective code channels, and (2) coherently demodulating the channelized data with a recovered pilot to provide demodulated data. Demodulate block 1330 may implement a rake receiver to process multiple signal instances.

Block 1334 may receive punctured symbol locations and convert symbols to consecutive bits. Block 1332 may zero log likelihood ratios (LLRs) at punctured bit epochs. Block 1336 may apply a channel de-interleave.

In block 1338, a channel decoder decodes the demodulated data to recover decoded data bits transmitted by the base station 104.

The term "information channel" disclosed herein may refer to a DRC channel, an ACK channel, or other channels containing the channel state information.

It is appreciated that the embodiments described herein provide some embodiments of asymmetric mode of operation for multi-carrier communication systems. There are other embodiments and implementations. Various disclosed embodiments may be implemented in an AN, an AT, and other elements in multi-carrier communication systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
    assigning a long code mask (LCM) to an information channel associated with a plurality of forward link carriers to transmit data from a base station or access network to an access terminal; and
    multiplexing the information channel on a reverse link carrier.

2. The method of claim 1, wherein the information channel includes at least one of data source channel (DSC) information, data rate control (DRC) information and acknowledgment (ACK) information.

3. The method of claim 2, further comprising offsetting the ACK information on the reverse link to reduce the reverse link peak to average.

4. The method of claim 2, further comprising instructing the access terminal on whether to multiplex the DSC information based on feedback from the access terminal.

5. The method of claim 1, wherein the multiplexing is code division multiplexing (CDM).

6. The method of claim 5, further comprising code division multiplexing the information channel on an I-branch and on a Q-branch.

7. The method of claim 5, wherein the information channel includes data rate control (DRC) information on both the I-branch and on the Q-branch.

8. The method of claim 5, wherein the information channel includes acknowledgment (ACK) information on both the I-branch and on the Q-branch.

9. The method of claim 5, further comprising transmitting the code division multiplexed information channel on the reverse link carrier.

10. The method of claim 7, further comprising covering the data rate control (DRC) information with Walsh codewords.

11. The method of claim 8, further comprising covering the acknowledgment (ACK) information with Walsh codewords.

12. The method of claim 7, further comprising combining the data rate control (DRC) information with data rate control (DRC) cover symbols on both the I-branch and on the Q-branch.

13. The method of claim 12, wherein the data rate control (DRC) cover symbols are channelized by offset Walsh codes.

14. A system comprising:
    a controller adapted to:
    assign a long code mask (LCM) to an information channel associated with a plurality of forward link carriers to transmit data from a base station or access network to an access terminal; and
    the access terminal being adapted to multiplex the information channel on a reverse link carrier.

15. The system of claim 14, wherein the controller is in the base station.

16. The system of claim 14, wherein the controller is in a base station controller or the access network.

17. The system of claim 14, wherein the information channel includes at least one of data source channel (DSC) information, data rate control (DRC) information and acknowledgment (ACK) information.

18. The system of claim 17, wherein the access terminal is adapted to offset the ACK information on the reverse link to reduce the reverse link peak to average.

19. The system of claim 14, wherein the multiplex is code division multiplex (CDM).

20. The system of claim 19, wherein the access terminal is adapted to transmit the code division multiplexed information channel on the reverse link carrier.

21. The system of claim 17, wherein the access network is adapted to instruct the access terminal on whether to multiplex the DSC information based on feedback from the access terminal.

22. An access terminal comprising:
- receiver to receive data from a base station on a long code mask (LCM) of an information channel associated with a plurality of forward link carriers;
- transmitter to transmit data on a reverse link carrier to the base station; and
- means for multiplexing the information channel on the reverse link carrier.

23. The access terminal of claim 22, wherein the multiplexing means includes means for code division multiplexing (CDM).

24. The access terminal of claim 22, further comprising means for code division multiplexing the information channel on an I-branch and on a Q-branch.

25. The access terminal of claim 24, wherein the information channel includes data rate control (DRC) information on both the I-branch and on the Q-branch.

26. The access terminal of claim 24, wherein the information channel includes acknowledgment (ACK) information on both the I-branch and on the Q-branch.

27. The access terminal of claim 22, further comprising means for transmitting the code division multiplexed information channel on the reverse link carrier.

28. The access terminal of claim 25, further comprising means for covering the data rate control (DRC) information with Walsh codewords.

29. The access terminal of claim 26, further comprising means for covering the acknowledgment (ACK) information with Walsh codewords.

30. The access terminal of claim 25, further comprising means for combining the data rate control (DRC) information with data rate control (DRC) cover symbols on both the I-branch and on the Q-branch.

31. The access terminal of claim 25, wherein the data rate control (DRC) cover symbols are channelized by offset Walsh codes.

32. A computer-readable storage medium comprising code, which, when executed by a processor, causes the processor to perform operations for multi-carrier communication, the code comprising:
- code for processing data received from a base station on a long code mask (LCM) of an information channel associated with a plurality of forward link carriers;
- code for processing data for transmission on a reverse link carrier to the base station; and
- code for multiplexing the information channel on the reverse link carrier.

33. The computer-readable storage medium of claim 32, wherein the multiplexing code includes code for code division multiplexing (CDM).

34. The computer-readable storage medium of claim 32, further comprising code for code division multiplexing the information channel on an I-branch and on a Q-branch.

* * * * *